E. SCHMITZ.
INSECT CATCHER.
APPLICATION FILED SEPT. 29, 1917.
1,285,807.
Patented Nov. 26, 1918.
2 SHEETS—SHEET 1.
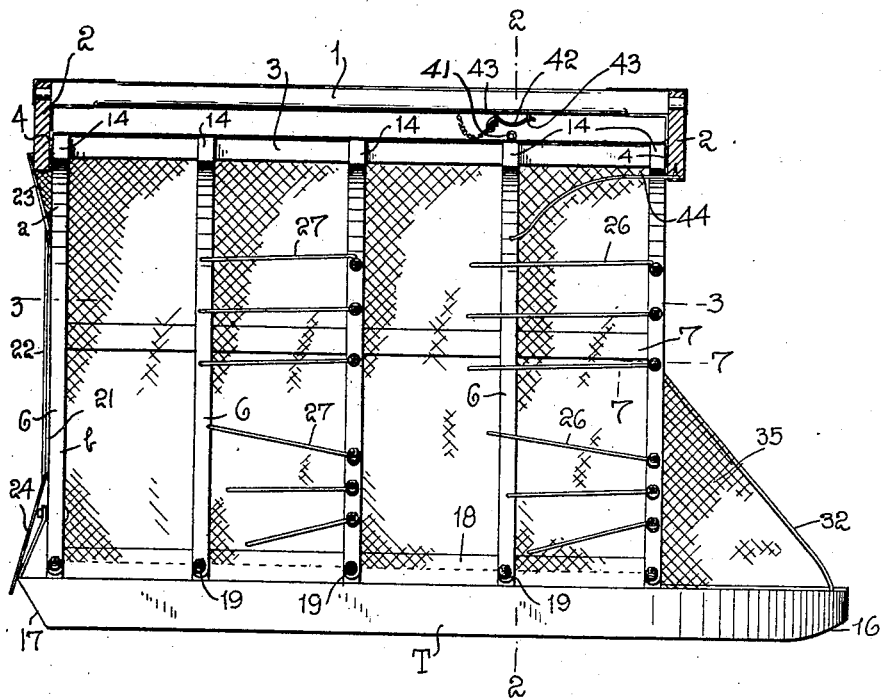
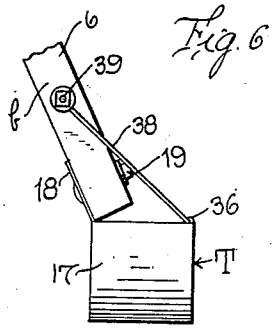
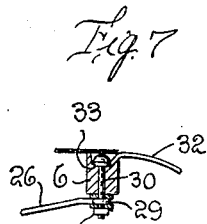
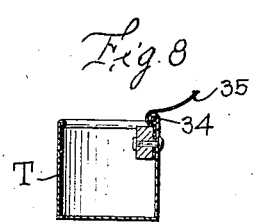
Inventor
E. SCHMITZ
By Watson E. Coleman
Attorney E. SCHMITZ.
INSECT CATCHER.
APPLICATION FILED SEPT. 29, 1917.
1,285,807.
Patented Nov. 26, 1918.
2 SHEETS—SHEET 2.
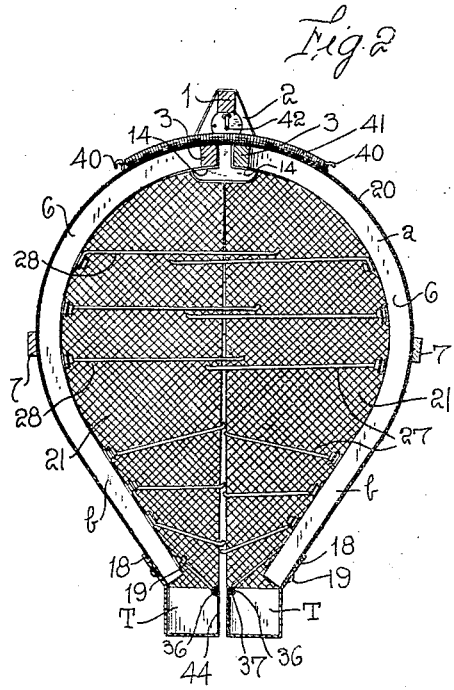
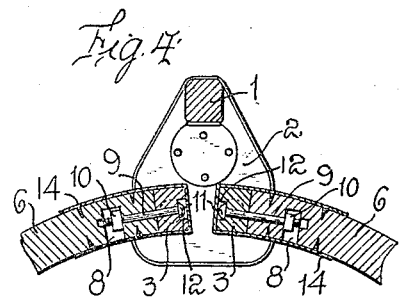
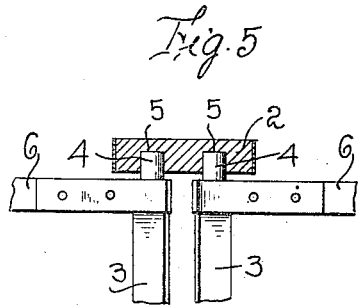
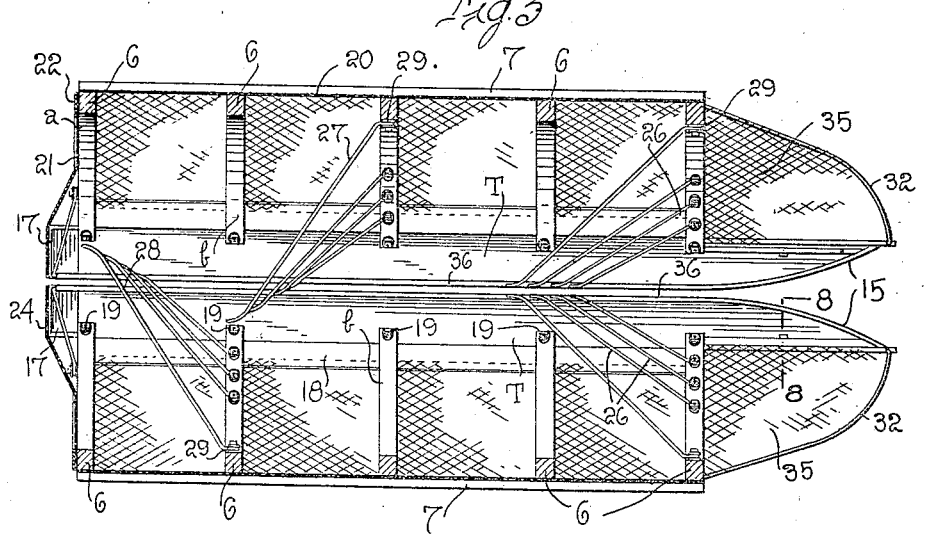
Inventor
E. Schmitz
By Watson E. Coleman
Attorney

UNITED STATES PATENT OFFICE.

EVIE SCHMITZ, OF TORRANCE, MISSISSIPPI, ASSIGNOR OF ONE-HALF TO THOMAS S. SCHMITZ, OF TORRANCE, MISSISSIPPI.

INSECT-CATCHER.

1,285,807. Specification of Letters Patent. Patented Nov. 26, 1918.

Application filed September 29, 1917. Serial No. 194,016.

*To all whom it may concern:*

Be it known that I, EVIE SCHMITZ, a citizen of the United States, residing at Torrance, in the county of Yalobusha and State of Mississippi, have invented certain new and useful Improvements in Insect-Catchers, of which the following is a specification, reference being had to the accompanying drawings.

This invention relates to certain improvements in insect catchers and has relation more particularly for use in connection with boll weevils and it is an object of the invention to provide a catcher of this general character having novel and improved means whereby the same may be readily and conviently transported and operated by a person.

It is also an object of the invention to provide a device of this general character which includes two relatively movable sections and wherein the lower portion of each of the sections is provided with a trough adapted to underlie the foliage of the plants from which the insects are to be dislodged and wherein each of the sections is provided with means for agitating the foliage to facilitate the dislodgment of the insects.

Furthermore, it is an object of the invention to provide a novel and improved device of this general character including a supporting member and two relatively movable sections operatively engaged with the supporting member together with means carried by the relatively movable section adapted to co-act with the supporting member for placing the sections under tension particularly when the device is employed in connection with small or young plants.

The invention consists in the details of construction and in the combination and arrangement of the several parts of my improved insect catcher wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein:

Figure 1 is a vertical longitudinal sectional view taken through a catcher constructed in accordance with an embodiment of my invention;

Fig. 2 is a sectional view taken substantially on the line 2—2 of Fig. 1;

Fig. 3 is a sectional view taken substantially on the line 3—3 of Fig. 1;

Fig. 4 is an enlarged fragmentary view partly in section and partly in elevation illustrating certain details of construction relative to the assemblage of the device;

Fig. 5 is an enlarged fragmentary view partly in top plan and partly in section illustrating the pivotal connections of the sections at corresponding ends thereof;

Fig. 6 is a fragmentary view in rear elevation illustrating in detail a supporting means for the rear portion of a trough as herein included;

Fig. 7 is a sectional view taken substantially on the line 7—7 of Fig. 1; and

Fig. 8 is a sectional view taken substantially on the line 8—8 of Fig. 3.

As disclosed in the accompanying drawings 1 denotes an elongated hand grasp or yoke disposed horizontally and which has rigidly secured to its opposite end portions the depending blocks or heads 2. Interposed between the heads 2 are the substantially parallel strips or rods 3. The strips or rods 3 are provided at their opposite ends with the trunnions 4 rotatably seated within the sockets 5 produced in the inner face of each of the blocks or heads 2 whereby the strips or rods 3 are capable of rocking movement.

Depending from each of the strips or rods 3 and spaced longitudinally thereof are the ribs or side arms 6. Each of the ribs 6 is bowed outwardly with the upper portion *a* thereof substantially semi-circular and the lower portion *b* thereof substantially straight. The ribs or arms 6 of each of the strips or rods 3 are preferably diametrically opposed and the straight portions *b* are arranged in convergence as is particularly illustrated in Fig. 2 of the accompanying drawings. The ribs, or arms 6 of each of the strips or rods 3 are tied or connected at a predetermined point intermediate their length by the longitudinally disposed strip or cleat 7 whereby said ribs or arms 6 are effectively maintained in fixed relative separated relation. The upper end of each of the ribs or arms 6 contacts with the outer side face of its co-acting strip or rod 3. The arm or rib 6 at a predetermined distance inwardly of its upper end is provided with the open slot or recess 8. A headed bolt 9 is disposed through the strip or rod 3 and extends within the open slot or recess 8, and the portion of the bolt 9 within the slot or recess 8 is engaged by the nut 10 or the like whereby the rib or arm 6 is effectively secured to the strip or rod 3. The head 11 of the bolt 9 is seated within a recess or pocket 12 produced in the inner face of the strip or rod 3 so that no obstruction will be afforded to the metallic strap 14 which is also employed for maintaining the rib or arm 6 and the strip or rod 3 in connected relation.

Each strip or rod 3 and the co-acting ribs or arms 6 afford a section of my improved catcher and carried by the lower end portions of the arms or ribs 6 of each of the sections is a trough T. Each of the troughs T is substantially rectangular in cross section and has its upper face open and said trough is of such a length as to extend in advance and rearwardly of the section. The forward end portions of the troughs T are outwardly curved as at 15 whereby said forward end portions of the troughs are substantially in divergence. This arrangement serves to facilitate the entrance of the stalks of the plants between the troughs. It is also preferred that the bottom of each of the troughs T at its forward end portions is disposed on a predetermined upward incline as indicated at 16 so that said trough may readily ride over any obstruction with which it may come in contact. The rear wall 17 of the trough T is also disposed on an incline in order to facilitate the removal of the insects collected within the troughs. In removing the insects it is preferred that a hoe like implement be employed and which implement is drawn longitudinally of the trough toward the rear end thereof. The outer longitudinal wall of the trough is provided with an upstanding wing 18 which is secured through the medium of the bolts 19 or the like to the lower end portions of the arms or ribs 6.

Disposed over the ribs or arms 6 of each of the sections is the reticulated fabric 20 which extends from the wing 18 of one of the troughs T to the wing 18 of the second trough. The fabric 20 extends between the ribs or arms 6 and the strips or cleats 7 and also between the wings 18 and the lower end portions of said ribs or arms 6. A portion of the fabric 20 immediately adjacent the strips 3 is free of the ribs or arms 6 and the strips 3 so that no interference will be offered by the fabric 20 to the relative swinging movement of the sections. Secured to the rear rib or arm 6 of each of the sections is a reticulated fabric 21 held to the arm or rib 6 by a plate 22 or the like. The fabric 21 conforms to substantially the field defined by the arm or rib 6 and the upper portion of the fabric 21 immediately adjacent the strip or rod 3 is free of the arm or rib 6 of the strip as indicated at 23 and overlies the adjacent block or head 2 so that said fabric 21 also will not offer any interference to the relative swinging movement of the sections. The lower portion 24 of the fabric 21 is also free of the lower end portion of the rib or arm 6 and overlies the rear end portion of the adjacent trough T as particularly illustrated in Fig. 1.

The adjacent vertical margins of the fabrics 21 are in close proximity one to the other but in separated relation so that the foliage of the plants with which my improved catcher is employed may readily pass therebetween.

Each of the front or forward ribs or arms 6 has secured thereto a plurality of vertically spaced arms 26 extending rearwardly therefrom on a predetermined transverse incline. A central rib or arm 6 of one of the sections is also provided with a series of vertically spaced and rearwardly directed arms 27 extending in substantially a transverse direction while a rib or arm 6 of the second section rearwardly of the rib or arm with which the arms 27 co-act is provided with substantially a similarly arranged series of vertically spaced arms 28. The arms 26, 27 and 28 serve to effectively agitate the foliage of the plants with which my improved catcher co-acts so that the insects are dislodged from the foliage. The reticulated fabric 20 serves to deflect the dislodged insects into the troughs T while the rear fabrics 21 serve to prevent the escape of the dislodged insects. It will also be understood that as the foliage passes out between the fabrics 21 said fabrics will serve to further agitate the foliage to facilitate the catching of the insects.

Each of the arms 26, 27 or 28 comprises an elongated strand of resilient wire or the like having its inner end portion formed into an eye 29. Extending through the eye 29 is a bolt 30 disposed through the adjacent rib or arm 6 and mounted upon the bolt 30 is a nut 31 which serves to clamp the arm 26 in operative position. By this arrangement it will be at once self evident that the arms 26, 27 or 28 may be adjusted at different angles with convenience and facility as it is only necessary to loosen a nut 31 to effect an adjustment of an arm 26, 27 or 28 about its retaining bolt 30.

Interposed between the forward end of the outer side wall of each of the troughs T and the adjacent rib or arm 6 at a predetermined distance above the trough is the outwardly bowed or curved strand 32 of wire or other material which has its upper end provided with an eye 33 through which is disposed one of the retaining bolts 30 as illustrated in Fig. 7 whereby the upper end portion of said strand 32 is effectively secured to the rib or arm 6. The lower end portion of the strand 32 is extended within a bead 34 formed at the upper margin of the outer wall of the trough T. Suitably secured along one edge of the strand 32, at its vertical edge to the adjacent rib or arm 6 and at its lower margin to the outer wall of the trough T is a reticulated fabric 35 which affords an outwardly directed wing to facilitate the entrance of the foliage of the plants to be operated upon between the sections of my improved catcher. The upper longitudinal margin of the inner wall of each of the troughs is provided with a bead 36 through which is directed a strengthening or reinforcing wire 37. The rear portion of the wire 37 is extended upwardly and outwardly as indicated at 38 and has its upper end portion suitably fixed to a bolt 39 or the like carried by the adjacent rear rib or arm 6 whereby an effective support is afforded for the rear portion of the trough T and which particularly serves to hold the trough T against vertical swinging movement independently of the ribs or arms 6. In practice the troughs T move one toward the other by gravity yet are capable of ready separation as the device is passed over the foliage of the plants to be treated. However, when my improved device is employed in connection with young plants it has been found of especial importance to provide means whereby the sections may be placed under tension so that the troughs will not crush or otherwise injure plants or more particularly the stalks thereof. For this reason I provide transversely alined ribs or arms 6 of each of the sections at a predetermined point inwardly of the strips 3 with the hooks 40 or other anchoring members and engaged with said hooks 40 are the end portions of a retractile member 41 herein disclosed as a conventional coil spring. When the member 41 is in the position indicated in Fig. 2 it exercises no influence upon the sections as the member is substantially free of tension. However, when the member 41 is engaged with the elongated member or handle 1 the member 41 is placed under tension and therefore serves to impart a slight separation or separating movement to the troughs T. 42 denotes an arcuate strip co-acting with the eyelets 43 depending from the member or yoke 1 and which serves as a medium for securing the retractile member 41 to the elongated member or yoke 1 when it is desired to place the member 41 under tension.

To further agitate the foliage and more particularly the upper portion thereof I find it of advantage to secure to the lower edge or face of the front or forward block or head 2 the rearwardly directed resilient arm 44 disposed on a predetermined downward curvature as is particularly illustrated in Fig. 1 of the accompanying drawings.

From the foregoing description, it is thought to be obvious that an insect catcher constructed in accordance with my invention is particularly well adapted for use by reason of the convenience and facility with which it may be assembled and operated and it will also be obvious that my invention is susceptible of some change and modification without materially departing from the principles and spirit thereof and for this reason I do not wish to be understood as limiting myself to the precise arrangement and formation of the several parts herein shown in carrying out my invention in practice except as hereinafter claimed.

I claim:

1. A device of the character described comprising an elongated member serving as a hand grasp, heads arranged at the opposite ends of the elongated member, substantially parallel strips interposed between and supported by said heads and mounted for rocking movement, a plurality of outwardly curved arms carried by each of the strips and spaced longitudinally thereof, troughs operatively engaged with the opposite end portions of the arms, an inclosing wall coacting with the ribs, inwardly directed resilient arms secured to certain of the ribs and a rearwardly directed resilient arm carried by the forward head disposed downwardly.

2. An insect catcher comprising an elongated member serving as a hand grasp, sections pivotally engaged with the elongated member and capable of lateral swinging movement, troughs disposed longitudinally of the lower end portions of the sections, agitating means carried by the sections, a retractile member overlying the pivoted marginal portions of the sections and having its extremities secured thereto, and means carried by the elongated member and engageable with the retractile member for placing said retractile member under tension.

In testimony whereof I hereunto affix my signature in the presence of two witnesses.

EVIE SCHMITZ.

Witnesses:
J. D. FLOYD,
J. N. BAILEY.

Copies of this patent may be obtained for five cents each, by addressing the "Commissioner of Patents, Washington, D. C."